July 11, 1939.  C. W. CRUMRINE  2,165,346

FOLDING CAMERA CONSTRUCTION

Filed Dec. 31, 1937

Chester W. Crumrine
INVENTOR

BY
ATTORNEYS

Patented July 11, 1939

2,165,346

UNITED STATES PATENT OFFICE 2,165,346

FOLDING CAMERA CONSTRUCTION

Chester W. Crumrine, Rochester, N. Y., assignor to Eastman Kodak Company, Rochester, N. Y., a corporation of New Jersey Application December 31, 1937, Serial No. 182,845

6 Claims. (Cl. 95—31)

This invention relates to photography and more particularly to photographic cameras.

One object of my invention is to provide a folding camera so constructed that the objective can be readily and accurately alined with respect to the focal plane on the camera. Another object of my invention is to provide a camera of the folding type in which the camera is made in two relatively adjustable parts, one the camera body and the other the folding structure which may be attached to the camera body. Another object of my invention is to provide a camera with an objective alining means by which the exposure frame of the camera and the objective may be accurately located with respect to each other. Still another object of my invention is to provide a camera structure which is extremely simple to assemble and in which the folding part of the camera may be assembled separately and attached to the camera body after assembly and, in addition, to provide means for properly alining the two camera parts. A still further object of my invention is to provide a camera in which the latch elements are entirely carried by one part of the camera so that when once properly adjusted, the latch elements will continue to function even though the position of the camera part is altered with respect to the remainder of the camera for alining the objective. Other objects will appear from the following specification, the novel features being particularly pointed out in the claims at the end thereof.

In cameras, and particularly in the so-called miniature cameras using objectives of extreme aperture, such as f1.9 or f2, it is particularly necessary to not only hold the film in the focal plane, but to have the objective very accurately alined with respect to the focal plane, that is, to make sure that the axis of the objective is exactly at right angles to the focal plane of the camera. In folding cameras this is somewhat difficult because of manufacturing variations which are almost bound to occur in the movable parts of the camera which fold, so that it is frequently impossible to prevent the camera front, when assembled in a normal manner, from being slightly out of parallel with the focal plane of the camera. Moreover, it sometimes happens that the threaded portion of the shutter and the seats for the objective on the shutter, while parallel to each other (that is, the seats for the two lens cells) may not be exactly parallel to the camera front.

This lack of extreme accuracy is not at all noticeable in cameras utilizing lenses of normal apertures from f8 to f4.5 for instance, but a few thousandths of an inch make a great deal of difference in lenses of extreme aperture. Consequently, the structure which will now be described has been designed to make possible extreme accuracy of the objective with respect to the focal plane of the camera without materially increasing the cost of the camera and its assembly.

Coming now to the drawing wherein like reference characters denote like parts throughout:

Figure 1:
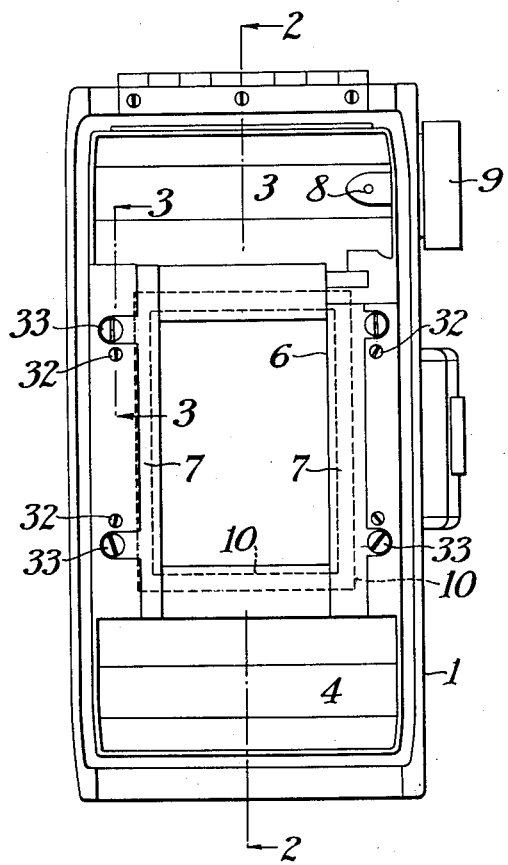
Fig. 1 is a plan view of the back of a camera with the camera back removed, constructed in accordance with and embodying a preferred form of my invention.
Figure 2:
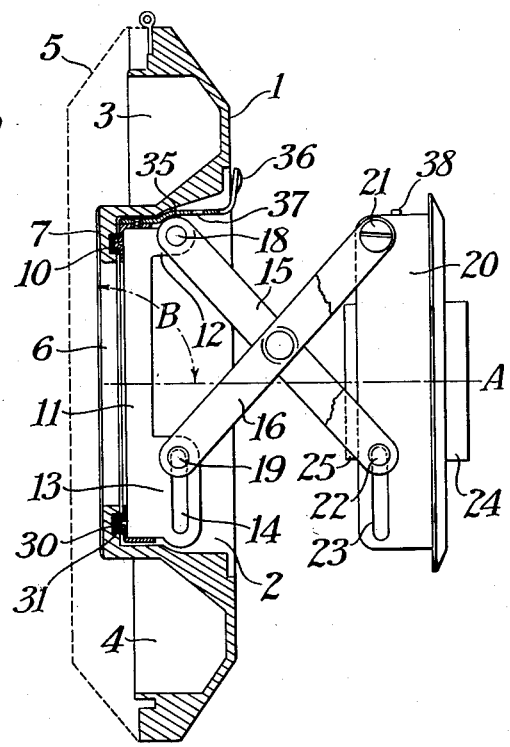
Fig. 2 is a section taken on line 2—2 of Fig. 1, but with certain parts shown in elevation and certain parts omitted.
Figure 3:
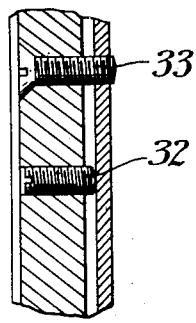
Fig. 3 is an enlarged sectional view on line 3—3 of Fig. 1.

A preferred embodiment of my invention is shown in the drawings wherein the camera body 1 may be made of substantial material, such as a die-casting, although a molded material may be used, if desired. This camera body 1 has a recess 2 in the front to receive the folding parts of the camera and is also provided with the usual spool chambers 3 and 4. A camera back of the normal type, indicated only in dotted lines at 5, covers an exposure frame 6 and with cameras of this type the focal plane is usually defined by a pair of spaced parallel rails 7. These rails may be accurately machined so that they will be exactly parallel and will form smooth runways to support a film passing from the supply spool chamber 4 to the take-up spool chamber 3, where a winding key 8, which may be turned by handle 9, may be used to wind up exposed areas of film. On the inside of the exposure frame 6, a rabbet or groove 10 extends around all four sides of the exposure frame as indicated in Fig. 1. Thus the camera body 1 has a recess 2 which is grooved at 10.

The folding portion of the camera consists of a rear frame 11 which is substantially L-shaped in cross-section and which carries spaced lugs 12 at one end and spaced lugs 13 at the other end. Lugs 13 are slotted at 14. A pair of lazy tongs consisting of links 15 and 16 are pivoted together at 17, the links 15 being attached by studs 18 to lugs 12 and the links 16 carrying studs 19 which slide in the slots 14 at the opposite end. These links have similar connections with the camera front 20, that is, the links 16 are pivotally attached by studs 21 to the front at one end and the links 15 carry studs 22 which may slide in the slots 23 in the front board at the opposite end. Thus, the front may move relative to the rear frame as the lazy tongs permit such movement in a well known manner. The camera front 20 carries a front lens cell 24 and a rear lens cell 25, both of these cells carrying elements forming an objective. Each of the cells may have the usual threaded engagement with the front 20 which is a box-like housing containing any well known type of shutter mechanism.

Figure 4:
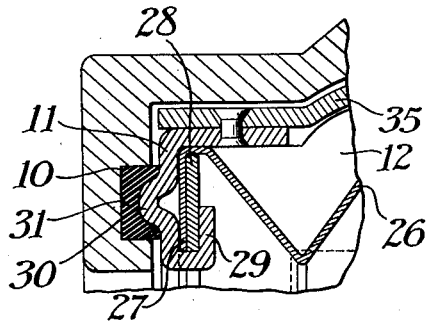
Fig. 4 is an enlarged fragmentary sectional detail showing the bellows mounting.

A bellows 26 may be attached to the rear frame 11 in the manner shown in Fig. 4, that is, the end 27 of the bellows is clamped between the rear frame 11 and a second frame 28 by means of ears 29 which are folded over the frame 28 in a well known manner. The front end of the bellows 26 is connected to the camera front 20.

It should be noticed that the folding part of the camera, that is, the rear frame 11, front 20, lazy tongs 15 and 16 and bellows 26 may be assembled as a unit and may be attached to the camera body 1.

In order to form a light-tight joint between the camera body 1 and the rear frame 11, the rear frame carries a flange 30 which is adapted to project into the groove 10 which extends around the exposure frame. In many instances the flange 30 and the groove 10 can be made with sufficient overlap to provide a light-tight connection between the two members and definitely prevent any light from leaking around the edge of the rear frame and the camera body. However, if it should be necessary to provide an additional light guard, as in cameras where it is not possible to have sufficient overlap between the flange 30 and the groove 10, I propose to place a resilient or expansible gasket 31 in the groove 10 so that the flange 30 will extend into this gasket and thus make a light-tight joint. Such a gasket may be made of felt, soft rubber or other material which is capable of being compressed and excluding light.

As explained above, it is highly necessary, particularly with the new fast lenses, to assemble a camera so that the axis A is exactly at right angles to the focal plane of the camera as defined by the rails 7. Thus, the angle B must be 90°. In order to accomplish this, I have provided eight screws, two at each corner of the bellows frame 6, one set of screws 32 being set screws and the other set of screws 33 being holding screws. By adjusting the set screws 32 to the proper position in assembling the camera and by attaching the rear frame 11 by the screws 33, a very accurate alinement of the camera objective can be made. Usually it is only necessary to adjust the frame 11 a comparatively few thousandths of an inch with respect to the camera body at any one corner. However, with a suitable alining apparatus, it has been found that this adjustment is almost always necessary, because, as explained above, manufacturing variations are almost bound to occur in various parts of the folding section of the camera. It will be readily seen that if the frame 11 is not exactly flat or does not exactly lie in a plane, this will be immaterial because the variation can be taken up with the two sets of screws 32 and 33. The two important parts of any camera—that is, the parts which define the focal plane of the film and the parts which accurately aline the objective with the focal plane can still be adjusted with extreme accuracy.

In order to provide a latch which will function even though the folding parts of the camera have been shifted with respect to the camera body, I attach a latch member 35 to a flange 11 so that the handle of this latch member, 36, may project from the front of the camera and a latch element carried thereby—the aperture 37 may always lie in alinement with the latch element 38—here shown as a pin—carried by the folding part 20. Thus, these latch elements can be properly adjusted when the folding part of the camera is assembled and before it is attached to the camera body.

There is another advantage in providing a camera construction as above described and in mounting the rear end of the bellows on a frame which is movable with respect to the camera body, and that is that where injuries occur to the bellows, it is a very simple matter to remove the folding parts of the camera and substitute a new bellows. This is much more difficult to do where the bellows is attached to the camera body because it is impossible to provide lugs 29 which may be bent over to clamp a bellows in place on a die-cast body member 1 or in a body 1 which has been made of moldable material. It is also usually inconvenient to attach a supplementary metal frame to a molded camera body so that by attaching the bellows frame to an inner frame formed of sheet metal which may be readily bent, a very satisfactory type of bellows support is provided.

It should be noticed that when the camera described above is being assembled, the entire foldable section may be rocked as a unit, both transversely and longitudinally of the exposure frame and consequently, the axis A of the objective can be so positioned that the angle between this axis and the plane of the film—the angle B—can be accurately controlled.

What I claim as my invention and desire to be secured by Letters Patent of the United States is:

1. In a photographic camera, the combination with a camera body forming one camera part, of a foldable camera part carried by the camera body, means for attaching the two camera parts, said attaching means including a plurality of manually movable threaded fastening members on one part, threaded sockets on the other part into which the threaded fastening members fit, a plurality of set screws threaded to one part and contacting with the other part for varying the relationship between the camera body part and the folding camera part on assembling said parts, said camera body part including a groove, and a flange on the other camera part lying in the groove and making a light-tight connection therewith.

2. In a photographic camera, the combination with a camera body forming one camera part, of a foldable camera part carried by the camera body, means for attaching the two camera parts, said attaching means including a plurality of manually movable threaded fastening members, a plurality of threaded apertures to receive the threaded fastening members, a plurality of set screws carried by one part and engaging the opposite part for varying the relationship between the camera body part and the folding camera part on assembling said parts and a resilient gasket between the two camera parts for forming a light-tight connection therebetween.

3. In a photographic camera, the combination with a camera body forming one camera part, of a foldable camera part carried by the camera body, means for attaching the two camera parts, said attaching means including a plurality of manually movable threaded fastening members, a plurality of threaded apertures to receive the threaded members, a plurality of set screws carried by one part and engaging the other part for varying the relationship between the camera body part and the folding camera part on assembling said parts, said camera body part including a groove, and a flange on the other camera part lying in the groove and making a light-tight connection therewith, and a resilient gasket lying in the groove and contacting with the flange to form a light-tight connection between the parts.

4. In a photographic camera, the combination with a camera body including a recess, and a groove extending around the recess, of a folding structure comprising a camera front, a rear frame, foldable connections between the front and rear frame adapted to fold into the recess, a flange carried by the rear frame and extending into the groove of the camera body and means for varying the relationship between the camera body and folding structure while maintaining the flange and groove light-tight connection between the parts, comprising a plurality of screws on one part, a plurality of threaded sockets for the screws on the other part, and a plurality of set screws carried by one part and engaging the other part for accurately locating the parts relative to each other.

5. In a photographic camera, the combination with a camera body including a recess, and a groove extending around the recess, of a folding structure comprising a camera front, a rear frame, foldable connections between the front and rear frame adapted to fold into the recess, a flange carried by the rear frame and extending into the groove of a camera body, and means for varying the relationship between the camera body and folding structure, and comprising a plurality of set screws carried by one part and engaging the other part and a plurality of screws carried by one part and engaging threaded apertures in the other part, and a flexible gasket lying in said groove and contacting with said flange.

6. In a photographic camera, the combination with a camera body including a recess, and a groove extending around the recess, of a folding structure comprising a camera front, a rear frame, foldable connections between the front and rear frame adapted to fold into the recess, a flange carried by the rear frame and extending into the groove of the camera body, and means for varying the relationship between the camera body and folding structure, and comprising a plurality of set screws carried by one part and engaging the other part and a plurality of screws carried by one part and engaging threaded apertures in the other part, and a pair of latching elements one carried by the rear frame and the other carried by the camera front adapted to hold the parts in folded position.

CHESTER W. CRUMRINE.